(12) United States Patent
Halsey

(10) Patent No.: US 7,744,747 B2
(45) Date of Patent: Jun. 29, 2010

(54) OLEFIN PRODUCTION UTILIZING WHOLE CRUDE OIL/CONDENSATE FEEDSTOCK WITH A PARTITIONED VAPORIZATION UNIT

(75) Inventor: Richard B. Halsey, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 401 days.

(21) Appl. No.: 12/006,435

(22) Filed: Jan. 2, 2008

(65) Prior Publication Data

US 2009/0166255 A1    Jul. 2, 2009

(51) Int. Cl.
*C10G 69/06* (2006.01)

(52) U.S. Cl. .................. 208/130; 208/67; 208/72; 208/76; 208/106; 585/500; 585/648; 585/649; 585/650; 585/652

(58) Field of Classification Search ............ 208/67, 208/72, 76, 106, 130; 585/500, 648–650, 585/652

See application file for complete search history.

(56) References Cited

U.S. PATENT DOCUMENTS

| 5,817,226 | A | 10/1998 | Lenglet | 208/130 |
| 6,743,961 | B2 | 6/2004 | Powers | 585/648 |
| 7,019,187 | B2 | 3/2006 | Powers | 585/648 |
| 7,396,449 | B2 * | 7/2008 | Powers | 208/130 |
| 2007/0208207 | A1 * | 9/2007 | Powers | 585/648 |

* cited by examiner

*Primary Examiner*—Robert J Hill, Jr.
*Assistant Examiner*—Brian McCaig

(57) ABSTRACT

A method for thermally cracking a feed composed of whole crude oil and/or natural gas condensate using a partitioned vaporizer to gasify the feed before cracking same.

9 Claims, 3 Drawing Sheets

1

OLEFIN PRODUCTION UTILIZING WHOLE CRUDE OIL/CONDENSATE FEEDSTOCK WITH A PARTITIONED VAPORIZATION UNIT

BACKGROUND OF INVENTION

1. Field of Invention

This invention relates to the formation of olefins by thermal cracking of liquid whole crude oil and/or condensate derived from natural gas. More particularly, this invention relates to utilizing whole crude oil and/or natural gas condensate as a feedstock for an olefin production plant that employs hydrocarbon thermal cracking in a pyrolysis furnace in combination with a partitioned vaporization unit.

2. Description of the Prior Art

Thermal (pyrolysis) cracking of hydrocarbons is a non-catalytic petrochemical process that is widely used to produce olefins such as ethylene, propylene, butenes, butadiene, and aromatics such as benzene, toluene, and xylenes.

Basically, a hydrocarbon feedstock such as naphtha, gas oil, or other fractions of whole crude oil that are produced by distilling or otherwise fractionating whole crude oil, is mixed with steam which serves as a diluent to keep the hydrocarbon molecules separated. The steam/hydrocarbon mixture is preheated to from about 900 to about 1,000 degrees Fahrenheit (F.), and then enters the reaction zone where it is very quickly heated to a severe hydrocarbon thermal cracking temperature in the range of from about 1,450 to about 1,550 F. Thermal cracking is accomplished without the aid of any catalyst.

This process is carried out in a pyrolysis furnace (steam cracker) at pressures in the reaction zone ranging from about 10 to about 30 psig. Pyrolysis furnaces have internally thereof a convection section and a radiant section. Preheating is accomplished in the convection section, while severe cracking occurs in the radiant section.

After severe thermal cracking, the effluent from the pyrolysis furnace contains gaseous hydrocarbons of great variety, e.g., from one to thirty-five carbon atoms per molecule. These gaseous hydrocarbons can be saturated, monounsaturated, and polyunsaturated, and can be aliphatic, alicyclics, and/or aromatic. The cracked gas also contains significant amounts of molecular hydrogen (hydrogen).

Thus, conventional steam (thermal) cracking, as carried out in a commercial olefin production plant, employs a fraction of whole crude and totally vaporizes that fraction while thermally cracking same.

The cracked product is then further processed in the olefin production plant to produce, as products of the plant, various separate individual streams of high purity such as hydrogen, ethylene, propylene, mixed hydrocarbons having four carbon atoms per molecule, fuel oil, and pyrolysis gasoline. Each separate individual stream aforesaid is a valuable commercial product in its own right. Thus, an olefin production plant currently takes a part (fraction) of a whole crude stream and generates therefrom a plurality of separate, valuable products.

Natural gas and whole crude oil(s) were formed naturally in a number of subterranean geologic formations (formations) of widely varying porosities. Many of these formations were capped by impervious layers of rock. Natural gas and whole crude oil (crude oil) also accumulated in various stratigraphic traps below the earth's surface. Vast amounts of both natural gas and/or crude oil were thus collected to form hydrocarbon bearing formations at varying depths below the earth's surface. Much of this natural gas was in close physical contact with crude oil, and, therefore, absorbed a number of lighter molecules from the crude oil.

When a well bore is drilled into the earth and pierces one or more of such hydrocarbon bearing formations, natural gas and/or crude oil can be recovered through that well bore to the earth's surface.

The terms "whole crude oil" and "crude oil" as used herein mean liquid (at normally prevailing conditions of temperature and pressure at the earth's surface) crude oil as it issues from a wellhead separate from any natural gas that may be present, and excepting any treatment such crude oil may receive to render it acceptable for transport to a crude oil refinery and/or conventional distillation in such a refinery. This treatment would include such steps as desalting. Thus, it is crude oil that is suitable for distillation or other fractionation in a refinery, but which has not undergone any such distillation or fractionation. It could include, but does not necessarily always include, non-boiling entities such as asphaltenes or tar. As such, it is difficult if not impossible to provide a boiling range for whole crude oil. Accordingly, whole crude oil could be one or more crude oils straight from an oil field pipeline and/or conventional crude oil storage facility, as availability dictates, without any prior fractionation thereof.

Natural gas, like crude oil, can vary widely in its composition as produced to the earth's surface, but generally contains a significant amount, most often a major amount, i.e., greater than about 50 weight percent (wt. %), methane. Natural gas often also carries minor amounts (less than about 50 wt. %), often less than about 20 wt. %, of one or more of ethane, propane, butane, nitrogen, carbon dioxide, hydrogen sulfide, and the like. Many, but not all, natural gas streams as produced from the earth can contain minor amounts (less than about 50 wt. %), often less than about 20 wt. %, of hydrocarbons having from 5 to 12, inclusive, carbon atoms per molecule (C5 to C12) that are not normally gaseous at generally prevailing ambient atmospheric conditions of temperature and pressure at the earth's surface, and that can condense out of the natural gas once it is produced to the earth's surface. All wt. % are based on the total weight of the natural gas stream in question.

When various natural gas streams are produced to the earth's surface, a hydrocarbon composition often naturally condenses out of the thus produced natural gas stream under the then prevailing conditions of temperature and pressure at the earth's surface where that stream is collected. There is thus produced a normally liquid hydrocarbonaceous condensate separate from the normally gaseous natural gas under the same prevailing conditions. The normally gaseous natural gas can contain methane, ethane, propane, and butane. The normally liquid hydrocarbon fraction that condenses from the produced natural gas stream is generally referred to as "condensate," and generally contains molecules heavier than butane (C5 to about C20 or slightly higher). After separation from the produced natural gas, this liquid condensate fraction is processed separately from the remaining gaseous fraction that is normally referred to as natural gas.

Thus, condensate recovered from a natural gas stream as first produced to the earth's surface is not the exact same material, composition wise, as natural gas (primarily methane). Neither is it the same material, composition wise, as crude oil. Condensate occupies a niche between normally gaseous natural gas and normally liquid whole crude oil. Condensate contains hydrocarbons heavier than normally gaseous natural gas, and a range of hydrocarbons that are at the lightest end of whole crude oil.

Condensate, unlike crude oil, can be characterized by way of its boiling point range. Condensates normally boil in the range of from about 100 to about 650 F. With this boiling range, condensates contain a wide variety of hydrocarbonaceous materials. These materials can include compounds that make up fractions that are commonly referred to as naphtha, kerosene, diesel fuel(s), and gas oil (fuel oil, furnace oil, heating oil, and the like). Naphtha and associated lighter boiling materials (naphtha) are in the C5 to C10, inclusive, range, and are the lightest boiling range fractions in condensate, boiling in the range of from about 100 to about 400 F. Petroleum middle distillates (kerosene, diesel, atmospheric gas oil) are generally in the C10 to about C20 or slightly higher range, and generally boil, in their majority, in the range of from about 350 to about 650 F. They are, individually and collectively, referred to herein as "distillate" or "distillates." It should be noted that various distillate compositions can have a boiling point lower than 350 F and/or higher than 650 F, and such distillates are included in the 350-650 F range aforesaid, and in this invention.

The starting feedstock for a conventional olefin production plant, as described above, has first been subjected to substantial, expensive processing before it reaches that plant. Normally, condensate and whole crude oil is distilled or otherwise fractionated in a crude oil refinery into a plurality of fractions such as gasoline, naphtha, kerosene, gas oil (vacuum or atmospheric) and the like, including, in the case of crude oil and not natural gas, a high boiling residuum. Thereafter any of these fractions, other than the residuum, are normally passed to an olefin production plant as the starting feedstock for that plant.

It would be desirable to be able to forego the capital and operating cost of a refinery distillation unit (whole crude processing unit) that processes condensate and/or crude oil to generate a hydrocarbonaceous fraction that serves as the starting feedstock for conventional olefin producing plants. However, the prior art, until recently, taught away from even hydrocarbon cuts (fractions) that have too broad a boiling range distribution. For example, see U.S. Pat. No. 5,817,226 to Lenglet.

Recently, U.S. Pat. No. 6,743,961 (hereafter "USP '961" issued to Donald H. Powers. This patent relates to cracking whole crude oil by employing a vaporization/mild cracking zone (unit) that contains packing. This zone is operated in a manner such that the liquid phase of the whole crude that has not already been vaporized is held in that zone until cracking/vaporization of the more tenacious hydrocarbon liquid components is maximized. This allows only a minimum of solid residue formation which residue remains behind as a deposit on the packing. This residue is later burned off the packing by conventional steam air decoking, ideally during the normal furnace decoking cycle, see column 7, lines 50-58 of that patent. Thus, the second zone 9 of that patent serves as a trap for components, including hydrocarbonaceous materials, of the crude oil feed that cannot be cracked or vaporized under the conditions employed in the process, see column 8, lines 60-64 of that patent.

Still more recently, U.S. Pat. No. 7,019,187 issued to Donald H. Powers. This patent is directed to the process disclosed in USP '961, but employs a mildly acidic cracking catalyst to drive the overall function of the vaporization/mild cracking unit more toward the mild cracking end of the vaporization (without prior mild cracking)—mild cracking (followed by vaporization) spectrum.

The disclosures of the foregoing patents, in their entirety, are incorporated herein by reference.

One skilled in the art would first subject the feed to be cracked to a conventional distillation column to distill the distillate from the cracking feed. This approach would require a substantial amount of capital to build the column and outfit it with the normal reboiler and overhead condensation equipment that goes with such a column. In this invention, a vaporization unit (splitter or stripper) is employed in a manner such that much greater energy efficiency at lower capital cost is realized over a distillation column. By use of this vaporization unit, reboilers, overhead condensers, and related distillation column equipment are eliminated without eliminating the functions thereof, thus saving considerably in capital costs. Further, this invention exhibits much greater energy efficiency in operation than a distillation column because the extra energy that would be required by a distillation column is not required by this invention since this invention instead utilizes for its splitting function the energy that is already going to be expended in the operation of the cracking furnace (as opposed to energy expended to operate a standalone distillation column upstream of the cracking furnace), and the vapor product of the stripper goes directly to the cracking section of the furnace.

This invention employs a unique partitioned vaporization unit (zone) that can produce a side draw stream that is low, if not essentially free, of asphaltenes, tars, and/or solids that can be associated with the feed material that is routinely fed to that unit.

SUMMARY OF THE INVENTION

In accordance with this invention, there is provided a process for utilizing whole crude oil and/or natural gas condensate as the feedstock for an olefin plant, as defined above, in combination with a partitioned vaporization unit.

DETAILED DESCRIPTION OF THE INVENTION

Figure 1:
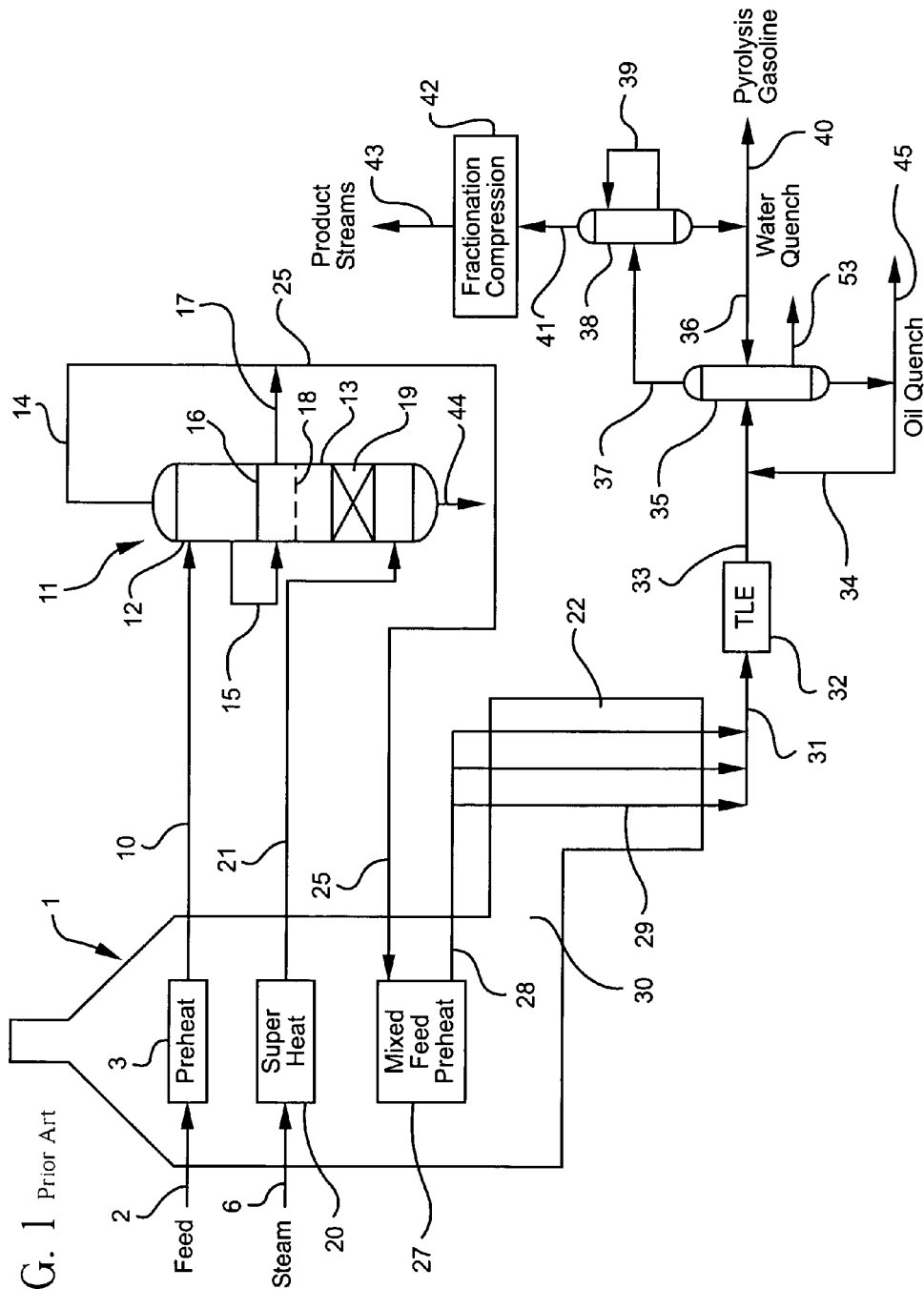
FIG. 1 shows a simplified flow sheet for a prior art process for thermally cracking whole crude oil/natural gas condensate using a vaporization unit that is not partitioned in the manner of this invention.

The terms "hydrocarbon," "hydrocarbons," and "hydrocarbonaceous" as used herein do not mean materials strictly or only containing hydrogen atoms and carbon atoms. Such terms include materials that are hydrocarbonaceous in nature in that they primarily or essentially are composed of hydrogen and carbon atoms, but can contain other elements such as oxygen, sulfur, nitrogen, metals, inorganic salts, and the like, even in significant amounts.

An olefin producing plant useful with this invention would include a pyrolysis (thermal cracking) furnace for initially receiving and cracking the feed. Pyrolysis furnaces for steam cracking of hydrocarbons heat by means of convection and radiation, and comprise a series of preheating, circulation, and cracking tubes, usually bundles of such tubes, for preheating, transporting, and cracking the hydrocarbon feed. The high cracking heat is supplied by burners disposed in the radiant section (sometimes called "radiation section") of the furnace. The waste gas from these burners is circulated through the convection section of the furnace to provide the heat necessary for preheating the incoming hydrocarbon feed. The convection and radiant sections of the furnace are joined at the "cross-over," and the tubes referred to hereinabove carry the hydrocarbon feed from the interior of one section to the interior of the next.

Cracking furnaces are designed for rapid heating in the radiant section starting at the radiant tube (coil) inlet where reaction velocity constants are low because of low temperature. Most of the heat transferred simply raises the hydrocarbons from the inlet temperature to the reaction temperature. In the middle of the coil, the rate of temperature rise is lower but the cracking rates are appreciable. At the coil outlet, the rate of temperature rise increases somewhat but not as rapidly as at the inlet.

Steam dilution of the feed hydrocarbon lowers the hydrocarbon partial pressure, enhances olefin formation, and reduces any tendency toward coke formation in the radiant tubes.

Radiant coils in the furnace heat the hydrocarbons to from about 1,450° F. to about 1,550° F. and thereby subject the hydrocarbons to severe cracking.

Hydrocarbon feed to the furnace is preheated to from about 900° F. to about 1,000° F. in the convection section by convectional heating from the flue gas from the radiant section, steam dilution of the feed in the convection section, or the like. After preheating in a conventional commercial furnace, the feed is ready for entry into the radiant section.

The cracked gaseous hydrocarbons leaving the radiant section are rapidly reduced in temperature to prevent destruction of the cracking pattern. Cooling of the cracked gases before further processing of same downstream in the olefin production plant recovers a large amount of energy as high pressure steam for re-use in the furnace and/or olefin plant. This is often accomplished with the use of transfer-line exchangers that are well known in the art.

Downstream processing of the cracked hydrocarbons issuing from the furnace varies considerably, and particularly based on whether the initial hydrocarbon feed was a gas or a liquid. Since this invention uses whole crude oil and/or liquid natural gas condensate as a feed, downstream processing herein will be described for a liquid fed olefin plant. Downstream processing of cracked gaseous hydrocarbons from liquid feedstock, naphtha through gas oil for the prior art, and crude oil and/or condensate for this invention, is more complex than for gaseous feedstock because of the heavier hydrocarbon components present in the liquid feedstocks.

With a liquid hydrocarbon feedstock downstream processing, although it can vary from plant to plant, typically employs termination of the cracking function by a transfer-line exchanger followed by oil and water quenches of the furnace effluent. Thereafter, the cracked hydrocarbon stream is subjected to fractionation to remove heavy liquids, followed by compression of uncondensed hydrocarbons, and acid gas and water removal therefrom. Various desired products are then individually separated, e.g., ethylene, propylene, a mixture of hydrocarbons having four carbon atoms per molecule, fuel oil, pyrolysis gasoline, and a high purity hydrogen stream.

In accordance with this invention, a process is provided which utilizes crude oil and/or condensate liquid that has not been subjected to fractionation, distillation, and the like, as the primary (initial) feedstock for the olefin plant pyrolysis furnace in whole or in substantial part. By so doing, this invention eliminates the need for costly distillation of the condensate into various fractions, e.g., from naphtha, kerosene, gas oil, and the like, to serve as the primary feedstock for a pyrolysis furnace as is done by the prior art as first described hereinabove.

This invention can be carried out using, for example, the apparatus disclosed in USP '961 when modified in accordance with the teachings of this invention. Thus, this invention is carried out using a self-contained vaporization facility that operates separately from and independently of the convection and radiant sections of the furnace. When employed outside the furnace, crude oil and/or condensate primary feed is preheated in the convection section of the furnace, passed out of the convection section and the furnace to a standalone vaporization facility. The vaporous hydrocarbon product of this standalone facility is then passed back into the furnace to enter the radiant section thereof. Preheating can be carried out other than in the convection section of the furnace if desired or in any combination inside and/or outside the furnace and still be within the scope of this invention.

The vaporization unit of this invention receives the condensate feed that may or may not have been preheated, for example, from about ambient to about 350 F, preferably from about 200 to about 350 F. This is a lower temperature range than what is required for complete vaporization of the feed. Any preheating preferably, though not necessarily, takes place in the convection section of the same furnace for which such condensate is the primary feed.

Thus, a first chamber in the vaporization operation step of this invention (zone 4 in USP '961) employs vapor/liquid separation wherein vaporous hydrocarbons and other gases, if any, in the preheated feed stream are separated from those distillate components that remain liquid after preheating. Gases can also be formed in this chamber. The aforesaid gases are removed from the vapor/liquid separation section and passed on to the radiant section of the furnace.

Vapor/liquid separation in this first, e.g., upper, chamber knocks out distillate liquid in any conventional manner, numerous ways and means of which are well known and obvious in the art.

Liquid thus separated from the aforesaid vapors moves into a second, e.g., lower, chamber (zone 9 in USP '961). This can be accomplished by external piping. Alternatively this can be accomplished internally of the vaporization unit. The liquid entering and traveling along the length of this second chamber meets oncoming, e.g., rising, steam. This liquid, absent the gases removed by way of the first chamber, receives the full impact of the oncoming steam's thermal energy and diluting effect.

This second chamber can carry at least one liquid distribution device such as a perforated plate(s), trough distributor, dual flow tray(s), chimney tray(s), spray nozzle(s), and the like.

This second chamber can also carry in a portion thereof one or more conventional tower packing materials and/or trays for promoting intimate mixing of liquid and vapor in the second zone.

As the remaining liquid hydrocarbon travels (falls) through this second chamber, lighter materials such as gasoline or naphtha that may be present can be vaporized in substantial part by the high energy steam with which it comes into contact. This enables the hydrocarbon components that are more difficult to vaporize to continue to fall and be subjected to higher and higher steam to liquid hydrocarbon ratios and temperatures to enable them to be vaporized by both the energy of the steam and the decreased liquid hydrocarbon partial pressure with increased steam partial pressure.

FIG. 1 shows one embodiment of the process just described in diagrammatic form for sake of simplicity and brevity.

FIG. 1 shows a conventional cracking furnace 1 wherein a crude oil and/or condensate primary feed 2 is passed in to the preheat section 3 of the convection section of furnace 1.

Steam 6 is also superheated in this section of the furnace for use in the process of this invention.

The pre-heated cracking feed is then passed by way of pipe (line) 10 to the aforesaid vaporization unit 11, which unit is separated into an upper vaporization chamber 12 and a lower chamber 13. This unit 11 achieves primarily (predominately) vaporization with or without mild cracking of at least a significant portion of the naphtha and gasoline boiling range and lighter materials that remain in the liquid state after the preheating step. Gaseous materials that are associated with the preheated feed as received by unit 11, and additional gaseous materials formed in zone 12, are removed from 12 by way of line 14. Thus, line 14 carries away essentially all the lighter hydrocarbon vapors, e.g., naphtha and gasoline boiling range and lighter, that are present and/or formed in chamber 12. Liquid distillate present in 12, with or without some liquid gasoline and/or naphtha, is removed there from via line 15 and passed into the upper interior of lower chamber 13. Chambers 12 and 13, in this embodiment, are separated from fluid communication with one another by an impermeable wall 16, which can be a solid tray. Line 15 represents external fluid down flow communication between chambers 12 and 13. In lieu thereof, or in addition thereto, chambers 12 and 13 can have internal fluid communication there between by modifying wall 16 to be at least in part liquid permeable by use of one or more trays designed to allow liquid to pass down into the interior of 13 and vapor up into the interior of 12. For example, instead of an impermeable wall 16, a chimney tray could be used in which case vapor carried by line 17 would pass internally within unit 11 down into section 13 instead of externally of unit 11 via line 15. In this internal down flow case, distributor 18 becomes optional.

By whatever way liquid is removed from 12 to 13, that liquid moves downwardly into the interior of 13, and thus can encounter at least one liquid distribution device 18. Device 18 evenly distributes liquid across the transverse cross section of unit 11 so that the liquid will flow uniformly across the width of the tower into contact with packing 19.

Dilution steam 6 passes through superheat zone 20, and then, via line 21 into a lower portion 22 of chamber 13 below packing 19. In packing 19 liquid and steam from line 21 intimately mix with one another thus vaporizing some of liquid 15. This newly formed vapor, along with dilution steam 21, is removed from 13 via line 17 and added to the vapor in line 14 to form a combined hydrocarbon vapor product in line 25. Stream 25 can contain essentially hydrocarbon vapor from feed 2, e.g., gasoline and naphtha, and steam.

Stream 17 thus represents a part of feed stream 2 plus dilution steam 21 less liquid distillate(s) and heavier from feed 2 that are present in bottoms stream 44. Stream 25 is passed through a mixed feed preheat zone 27 in a hotter (lower) section of the convection zone of furnace 1 to further increase the temperature of all materials present, and then via cross over line 28 into the radiant coils (tubes) 29 in the radiant firebox of furnace 1. Line 28 can be internal or external of furnace cross over conduit 30. Line 44 removes from stripper 11 the residuum, if any, from feed 2.

Steam 6 can be employed entirely in chamber 13, or a part thereof can be employed in either line 14 and/or line 25 to aid in the prevention of the formation of liquid in lines 14 or 25.

In the radiant firebox section 22 of furnace 1, feed from line 28 which contains numerous varying hydrocarbon components is subjected to severe thermal cracking conditions in coils 29 as aforesaid.

The cracked product leaves the radiant fire box section of furnace 1 by way of line 31 for further processing in the remainder of the olefin plant downstream of furnace 1 as shown in USP '961.

In a conventional olefin production plant, the preheated feed 10 would be mixed with dilution steam 21, and this mixture would then be passed directly from preheat zone 3 into the radiant section 22 of furnace 1, and subjected to severe thermal cracking conditions. In contrast, this invention instead passes the preheated feed at, for example, a temperature of from about 200 to about 350 F, into standalone portioned unit 11 (see FIG. 2) which is physically located outside of furnace 1.

In the embodiment of FIG. 1, cracked furnace product 31 is passed to at least one transfer line exchanger (TLE) 32 wherein it is cooled sufficiently to terminate the thermal cracking function. The cracked gas product is removed by way of line 33 and can be further cooled by injection of recycled quench oil 34 immediately downstream of TLE 32. The quench oil in streams 34 and 45 is a complex mixture of C12 and heavier hydrocarbons boiling in the range of from about 380 to about 700 F, and is often referred to as pyrolysis fuel oil or pyrolysis gas oil. Normally, pyrolysis fuel (gas) oil that is not recycled by way of line 34 is separated from the process by way of line 45, and used and/or sold as fuel oil, but can also be used in this invention as described here in after. The quench oil/cracked gas mixture passes via line 33 to oil quench tower 35. In tower 35 this mixture is contacted with a lighter boiling hydrocarbonaceous liquid quench material such as pyrolysis gasoline which contains primarily C5 to C12 hydrocarbons and boils in the range of from about 100 to about 420 F. Pyrolysis gasoline is provided by way of line 36 to further cool the cracked gas furnace product as well as condense and recover additional fuel oil product by way of lines 34 and 45. Cracked gas product is removed from tower 35 via line 37 and passed to water quench tower 38 wherein it is contacted with recycled and cooled water 39 that is recovered from a lower portion of tower 38. Water 39 condenses liquid pyrolysis gasoline in tower 38 which is, in part, employed as liquid quench material 36, and, in part, removed via line 40 for other processing elsewhere.

A lighter side draw stream 53 can be taken from unit 35 intermediate overhead 37 and bottoms streams 34/45 which stream 53 is composed essentially of pyrolysis gas oil boiling in the range of from about 380 to about 700 F. Stream 53 is also useful in this invention as described hereinafter.

The thus processed cracked gas product is removed from tower 38 via line 41 and passed to compression and fractionation facility 42 wherein individual product streams aforesaid are recovered as products of the cracking plant, such individual product streams being collectively represented by way of line 43.

Feed 2 can enter furnace 1 at a temperature of from about ambient up to about 300 F at a pressure from slightly above atmospheric up to about 100 psig (hereafter "atmospheric to 100 psig"). Feed 2 can enter zone 12 via line 10 at a temperature of from about ambient to about 500 F at a pressure of from atmospheric to 100 psig.

Stream 14 can be essentially all hydrocarbon vapor formed from feed 2 and is at a temperature of from about 500 to about 750 F at a pressure of from atmospheric to 100 psig.

Stream 15 can be essentially all the remaining liquid from feed 2 less that which was vaporized in pre-heater 3 and is at a temperature of from about 500 to about 750 F at a pressure of from atmospheric to 100 psig.

The combination of streams 14 and 17, as represented by stream 25, can be at a temperature of from about 650 to about 800 F at a pressure of from atmospheric to 100 psig, and contain, for example, an overall steam/hydrocarbon ratio of from about 0.1 to about 2.

Stream 28 can be at a temperature of from about 900 to about 1,100 F at a pressure of from atmospheric to 100 psig.

In chamber 13, dilution ratios (hot gas/liquid droplets) will vary widely because the composition of condensate varies widely. Generally, the hot gas 21, e.g., steam, to hydrocarbon ratio at the top of 13 can be from about 0.1/1 to about 5/1, preferably from about 0.1/1 to about 1.2/1, more preferably from about 0.1/1 to about 1/1.

Steam is an example of a suitable hot gas introduced by way of line 21. Other materials can be present in the steam employed. Stream 6 can be composed of that type of steam normally used in a conventional cracking plant. Such gases are preferably at a temperature sufficient to volatilize a substantial fraction of the liquid hydrocarbon 15 that enters chamber 13. Generally, the gas entering 13 from conduit 21 will be at least about 350 F, preferably from about 650 to about 1,000 F at from atmospheric to 100 psig. Stream 17 can be a mixture of steam and hydrocarbon vapor that has a boiling point lower than about 350 F. It should be noted that there may be situations where the operator desires to allow some distillate to enter stream 17, and such situations are within the scope of this invention. Stream 17 can be at a temperature of from about 600 to about 800 F at a pressure of from atmospheric to 100 psig.

It can be seen that steam from line 21 does not serve just as a diluent for partial pressure purposes as does diluent steam that may be introduced, for example, into conduit 2 (not shown). Rather, steam from line 21 provides not only a diluting function, but also additional vaporizing energy for the hydrocarbons that remain in the liquid state. This is accomplished with just sufficient energy to achieve vaporization of heavier hydrocarbon components and by controlling the energy input. For example, by using steam in line 21, substantial vaporization of feed 2 liquid is achieved. The very high steam dilution ratio and the highest temperature steam are thereby provided where they are needed most as liquid hydrocarbon droplets move progressively lower in 13.

Note that chamber 13 of prior art FIG. 1 contains transversely extending packing bed 19 and unitary distributor 18, so that the flow of liquid remainder 15 at the inlet (upper) end of 13 above distributor 18 is deliberately spread uniformly across the full transverse cross-section of 13 from the top to the bottom of that chamber. In this regard chamber 13 is not partitioned as to fluid flow transversely across its interior volume. That is to say, chamber 13 is not partitioned or otherwise channeled in regards to the transverse cross-sectional flow of fluid across the interior of chamber 13, and this is so from its upper inlet at 15 to its lower outlet at 44.

Figure 2:
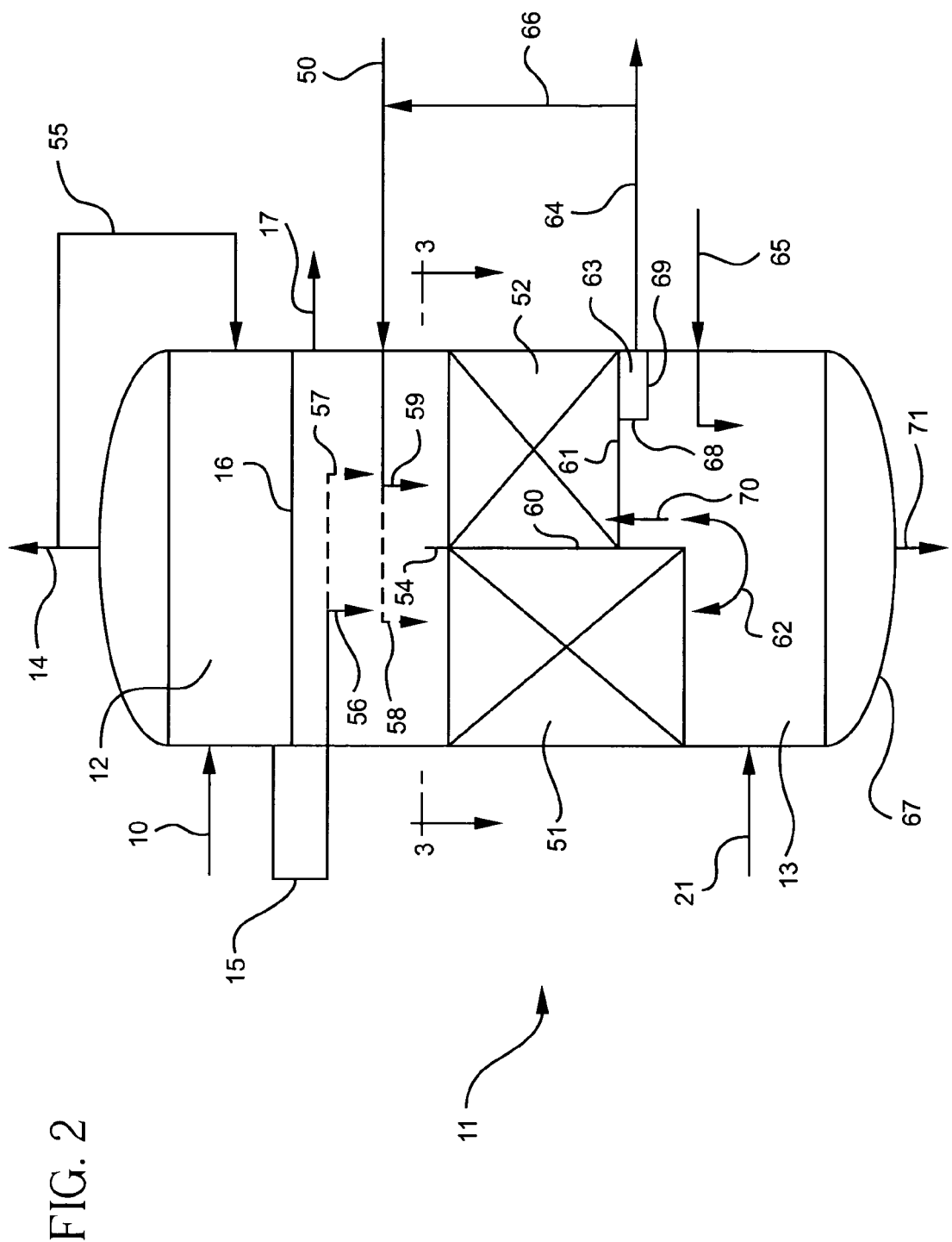
FIG. 2 shows a whole crude oil/condensate vaporization unit that has a lower chamber thereof partitioned in the manner of this invention.

FIG. 2 shows vaporization unit 11 without individual distributor 18 of FIG. 1 and modified pursuant to this invention so that lower chamber 13 that receives remaining liquid 15 from upper chamber 12 is physically vertically partitioned (divided) by an upstanding, fluid impervious wall 60 that is disposed within the inner volume of chamber 13 to form first and second volumes (sides) 51 and 52 that are each filled with packing like packing 19 of FIG. 1. Note that the combination of the packing filling volumes 51 and 52 together with partition 60 forms a structure that extends fully across the entire transverse cross-section of chamber 13, and leaves no large vertical passages or unobstructed conduit paths through this structure. Thus, liquid flowing downwardly from top to bottom in chamber 13 must pass through either packing 51 or packing 52, and at no transverse location across chamber 13 allowed to flow freely from the top to bottom without having to pass through a packing bed.

Partition 60 extends above the top of the packing at 54 to keep incoming remaining liquid 56 from line 15 on side 51 and out of side 52. Accordingly, sides 51 and 52 at their upper inlet ends are, by way of wall 60, physically separated as far as transverse liquid flow is concerned, but yet these inlet ends are in fluid communication as far as vapor movement is concerned so that gas from both sides can rise and be recovered by way of line 17 for transport to furnace 1 (FIG. 1). Similarly, the lower outlet ends of sides 51 and 52 that are nearer bottom 67 of unit 11 are physically separated as to liquid flow there between while still open at these outlet ends for the transfer of vapor there between as shown by arrow 62. Each of sides 51 and 52 can, if desired, carry an individual distributor (not shown) like unitary distributor 18. The individual distributors in each of sides 51 and 52 will be carried in an upper portion of those sides, and on opposite sides of partition 60.

Side 51 has no floor thereto, while side 52 has a vapor pervious floor 61 which can be, for example, a valved tray, and the like, which is well known in the art. Floor 61 thus catches liquid and directs it into sump 63 from which it is withdrawn by way of line 64, while still allowing any vapor 62 to pass upwardly through both floor 61 (as shown by arrow 70) and side 52 towards outlet line 17. Note that floor 61 can be located above the lower outlet level of side 51 for better liquid separation without impeding vapor transfer between sides 51 and 52.

Pursuant to this invention, the process within chamber 13 is broken down into two distinct steps. The first step is the passage of remaining liquid 15 downwardly through side 51 while keeping such liquid out of side 52. The second step is the introduction by way of line 50 into the upper inlet end of side 52 of a pyrolysis fuel oil type stream, and keeping this liquid out of side 51. Note that these two steps are carried out while the upper inlet ends (receiving streams 56 and 59) and the lower outlet ends of sides 51 and 52 are in open vapor communication with one another, for example at 62, while the separation of liquid streams 56 and 59 is maintained.

The quench oil bottoms stream 45 from prior art unit 35 of FIG. 1 can be passed, in whole or in part, into quench oil stream 65 in unit 11 of FIG. 2 of this invention. Lighter side draw pyrolysis gas oil stream 53 from prior art unit 35 of FIG. 1 can be passed, in whole or in part, into stream 50 in unit 11 of FIG. 2 of this invention.

Thus, in the primary mode of operation for this invention remaining liquid 15 will be processed essentially exclusively in side 51, while liquid pyrolysis fuel (gas) oil will be processed at the same time essentially exclusively in side 52, vapors at both the inlet and outlet ends of sides 51 and 52 being free to intermingle with one another. This separate two step operation within the same chamber 13 of unit 11 not only provides two streams 14 and 17 that are well suited for cracking in furnace 1 of FIG. 1, but, in addition, provides the flexibility of recovering a third stream 64 from sump 63.

Side draw stream 64 is a hydrocarbonaceous stream that is essentially free of asphaltenes, coke, and other solids that can be present in feed 10, and, therefore, is suitable for processes other than thermal cracking which cannot tolerate the presence of such solids, e.g., hydrocracking catalyst. For example, stream 64 not only is suitable for thermal cracking if desired, but, due to its lack of asphaltenes, coke, and other solids, can also be used as feed for conversion processes, refinery hydrocracking operations for upgrading to olefins plant feed or to a low sulfur gasoline blending component, hydrotreating, and the like. This is not the case for solids containing residual liquid removed from unit 11 by way of bottoms outlet 71.

Accordingly, stream 64 can vary widely in its hydrocarbon composition, but will generally primarily contain C5 to C20 hydrocarbons having a boiling range of from about 100 to about 700 F.

The process of this invention, by using a divided chamber in vaporization unit 11 is quite flexible. For example, if the operator desires, for any one of a number of reasons, he can pass a small but effective amount of remaining liquid 15 to the upper inlet end of side 52 as shown by arrow 57, and/or pass a small but effective amount of pyrolysis fuel (gas) oil to the upper inlet end of side 51 as shown by arrow 58. For example, stream 50 can be upgraded by way of processing in side 52 with its light ends going to furnace 1 by way of line 17, and its heavy aromatic end being fed to a hydrocracker by way of line 64. Such steps are optional, but, nevertheless available if the operator deems either or both of them to be worthwhile from an operational point of view.

Another option available to the operator is to recycle some of the high value, solids clean product 64 back to the inlet end of side 51 and/or side 52 as shown by arrows 66, 58, and 59. Loop line 66 can be provided with cooling capacity (not shown) if desired. Using solids clean product 64 in recycle loop 66 can improve vapor and liquid contacting inside chamber 13.

Yet another option is the introduction in a lower portion of chamber 13 below the outlets of sides 51 and 52 of a quench oil stream 65. This stream can be quench oil from line 45 of FIG. 1.

Figure 3:
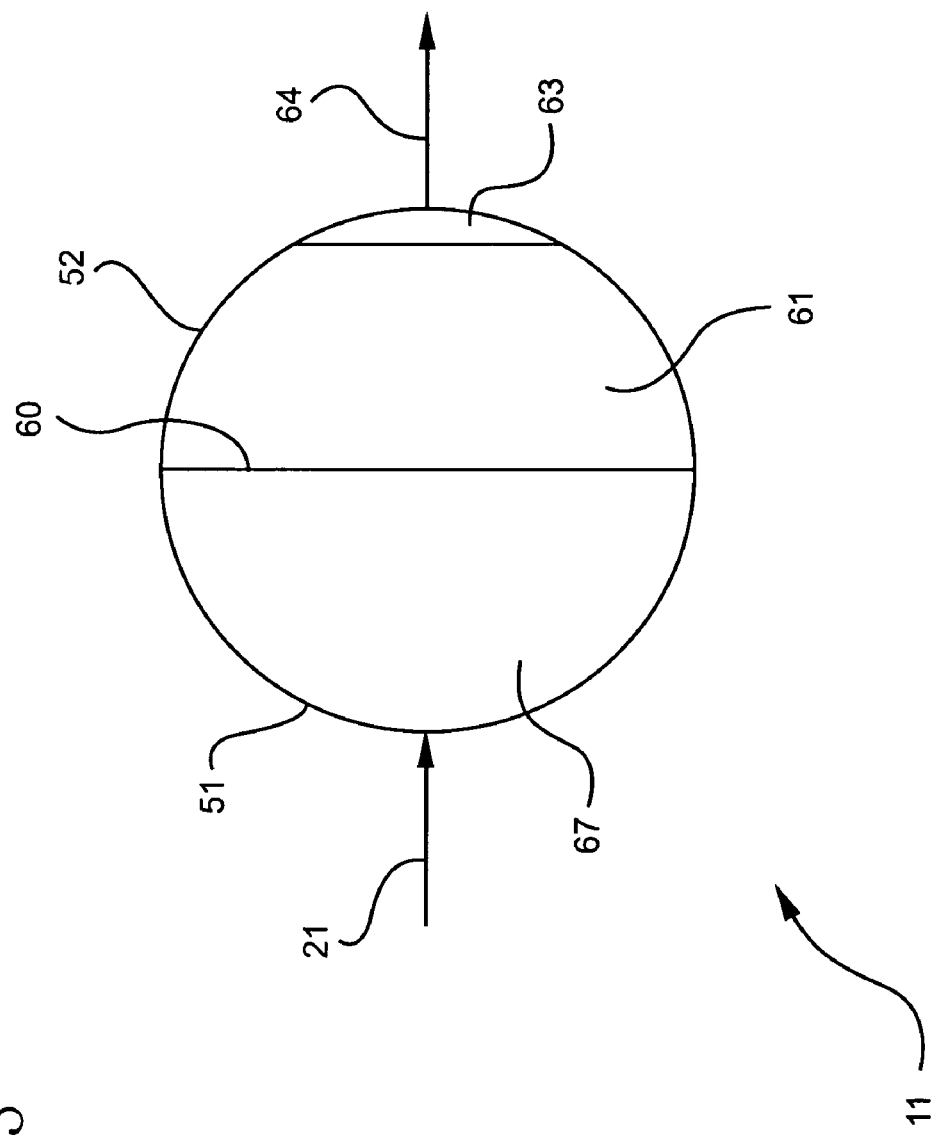
FIG. 3 shows a cross-section of the partitioned chamber of FIG. 2.

FIG. 3 shows a transverse cross-section through chamber 13 (see FIG. 1). The packing beds are not shown for sake of clarity in viewing bottom 67 and floor 61. FIG. 3 shows partition 60 to extend fully across the transverse cross-section of the interior of chamber 13, thereby forming a vertical liquid barrier between sides 51 and 52.

Example

A natural gas condensate stream 5 characterized as Oso condensate from Nigeria is removed from a storage tank and fed directly into the convection section of a pyrolysis furnace 1 at ambient conditions of temperature and pressure. In this convection section, this condensate initial feed is preheated to about 350 F at about 60 psig, and then passed into a vaporization unit 11 wherein a mixture of gasoline and naphtha gases at about 350 F and 60 psig are separated from distillate liquids in chamber 12 of that unit. The separated gases are removed from chamber 12 for transfer to the radiant section of the same furnace for severe cracking in a temperature range of 1,450° F. to 1,550° F. at the outlet of radiant coil 29.

The hydrocarbon liquid remaining from feed 2, after separation from accompanying hydrocarbon gases aforesaid, is transferred to lower chamber 13 and allowed to fall downwardly in that section toward the bottom thereof on side 51 of wall 60. At the same time pyrolysis fuel (gas) oil from oil quench tower 35 is introduced into chamber 13 by way of line 50 at a temperature of about 450 F and about 10 psig.

Preheated steam 21 at about 1,000 F is introduced near the bottom of chamber 13 to give a steam to hydrocarbon ratio in section 22 of about 0.5. The falling liquid droplets are in counter current flow with the steam that is rising from the bottom of chamber 13 toward the top thereof through both sides 51 and 52. With respect to the liquid falling downwardly in sides 51 and 52, the steam to liquid hydrocarbon ratio increases from the top to bottom of those sides.

A mixture of steam and naphtha vapor 17 at about 340 F is withdrawn from near the top of chamber 13 and mixed with the gases earlier removed from chamber 12 via line 14 to form a composite steam/hydrocarbon vapor stream 25 containing about 0.5 pounds of steam per pound of hydrocarbon present. This composite stream is preheated in zone 27 to about 1,000 F at less than about 50 psig, and introduced into the radiant firebox section of furnace 1.

A pyrolysis hydrocarbon side draw is recovered in line 64 at a temperature of about 400 F. This stream is essentially free of asphaltenes, coke, and other solids.

Bottoms product 71 of unit 11 is removed at a temperature of about 460 F, and pressure of about 60 psig. This stream contains essentially all of the asphaltense, coke, and other solids originally present in feed stream 10.

I claim:

1. In a method for operating an olefin production plant that employs a pyrolysis furnace to severely thermally crack hydrocarbon containing material for subsequent processing of the thus cracked product in said plant which method of plant operation includes 1) providing at least one of whole crude oil and natural gas condensate as said hydrocarbon containing material, 2) submitting said whole crude/condensate feed to a vaporization zone wherein said feed is substantially vaporized, and 3) feeding said substantially vaporized feed from said vaporization zone to said pyrolysis furnace, said vaporization zone having an inlet end and outlet end and performing at least first and second separate vaporization steps wherein A) in said first step gaseous materials present and formed in said first step are removed for transport to said pyrolysis furnace, leaving an essentially liquid remainder, and B) in said second step said essentially liquid remainder is subjected to more stringent conditions to vaporize a substantial part of said liquid remainder for transport to said pyrolysis furnace, the improvement comprising in said second step providing a physically partitioned vaporization chamber having first and second sides, each side having opposing inlet and outlet ends, said inlet and said outlet ends being in vapor communication with one another, feeding said essentially liquid remainder to said inlet end of said first side of said partitioned vaporization chamber, feeding a hydrocarbon stream having a boiling range of from about 380 to about 700 F to said inlet end of said second side of said partitioned vaporization chamber, and removing from said second side of said partitioned vaporization chamber a hydrocarbon stream having a boiling range of from about 100 to about 700 F.

2. The method of claim 1 wherein said hydrocarbon stream having a boiling range of from about 380 to about 700 F is essentially a liquid stream.

3. The method of claim 2 wherein said stream is essentially pyrolysis fuel (gas) oil.

4. The method of claim 1 wherein said hydrocarbon stream having a boiling range of from about 100 to about 700 F is essentially a liquid stream.

5. The method of claim 4 wherein said stream is essentially pyrolysis gasoline.

6. The method of claim 1 wherein a minor portion of said whole crude/condensate feed is also fed to said second side of said partitioned vaporization chamber.

7. The method of claim 1 wherein a minor portion of said hydrocarbon stream boiling in the range of from about 380 to about 700 F is fed to said first side of said partitioned vaporization chamber.

8. The method of claim 1 wherein a minor portion of said hydrocarbon stream boiling in the range of from about 100 to about 700 F after removal from said vaporization chamber is added to said hydrocarbon stream boiling in the range of from about 380 to about 700 F that is to be fed into said vaporization chamber.

9. The method of claim 1 wherein at least one quench oil is introduced into said partitioned vaporization chamber below said first and second sides.

* * * * *